No. 739,261. PATENTED SEPT. 15, 1903.
H. F. JAMES.
HOISTING, HOLDING, AND LOWERING DEVICE.
APPLICATION FILED MAR. 1, 1902.
NO MODEL. 5 SHEETS—SHEET 1.

WITNESSES: INVENTOR
Henry F. James
BY
E. Ray Inman
ATTORNEY

No. 739,261. PATENTED SEPT. 15, 1903.
H. F. JAMES.
HOISTING, HOLDING, AND LOWERING DEVICE.
APPLICATION FILED MAR. 1, 1902.
NO MODEL. 5 SHEETS—SHEET 2.

WITNESSES:
D. A. Hays
Elizabeth Smyers.

INVENTOR
Henry F. James
BY
E. Ray Inman
ATTORNEY

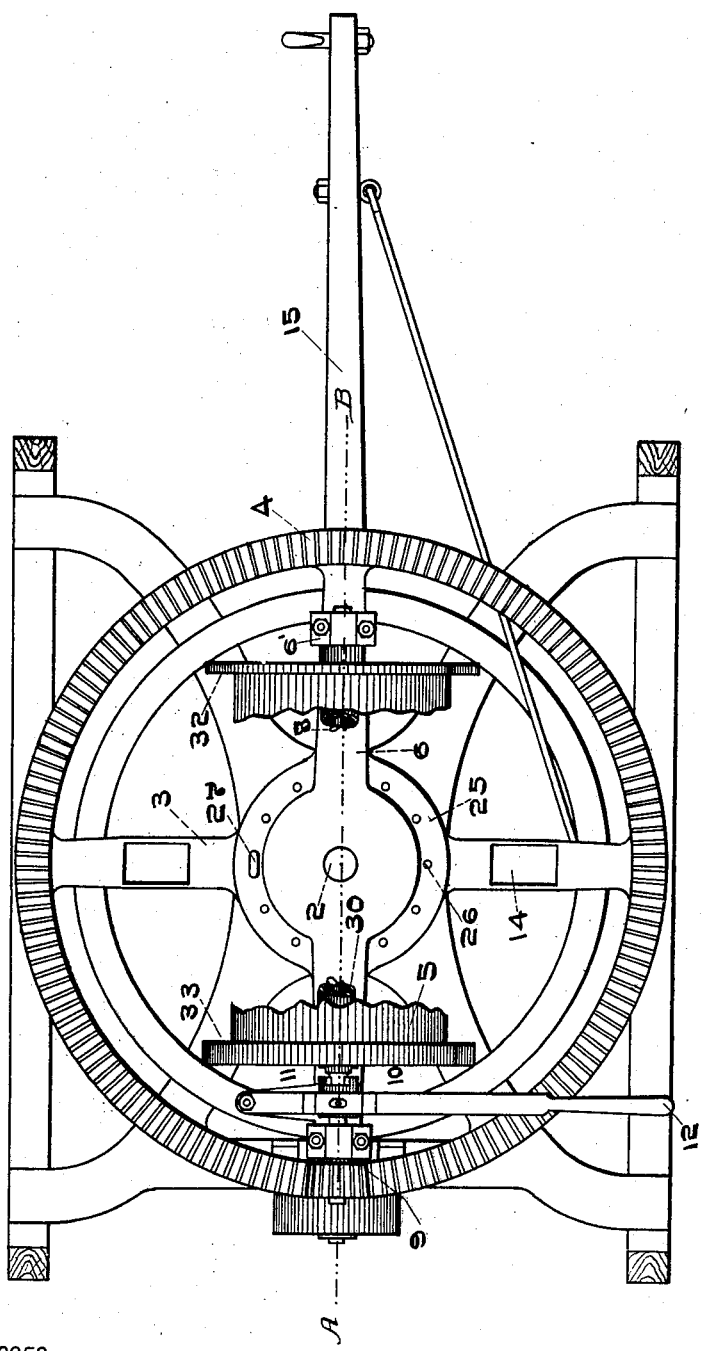

No. 739,261. PATENTED SEPT. 15, 1903.
H. F. JAMES.
HOISTING, HOLDING, AND LOWERING DEVICE.
APPLICATION FILED MAR. 1, 1902.
NO MODEL. 5 SHEETS—SHEET 4.
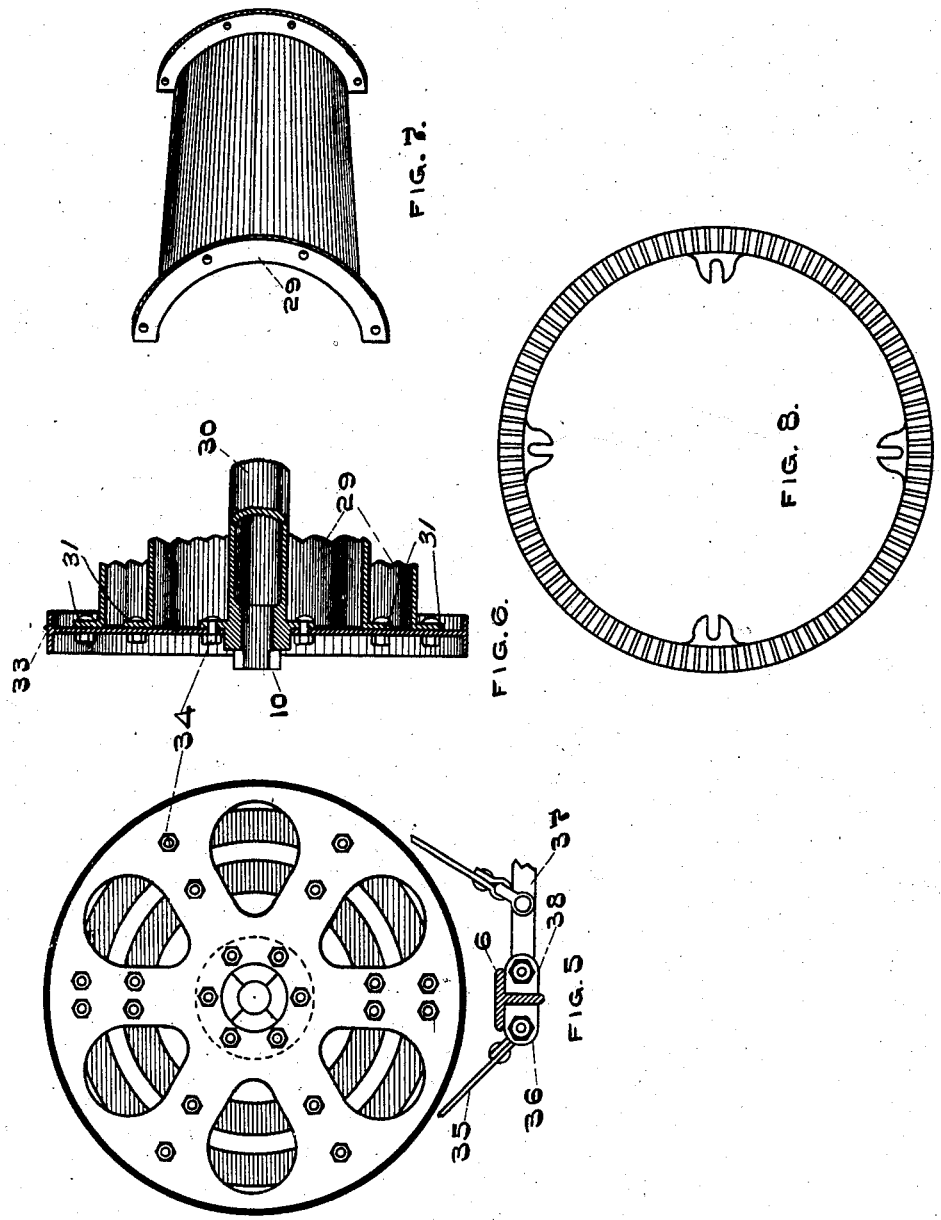

No. 739,261. PATENTED SEPT. 15, 1903.
H. F. JAMES.
HOISTING, HOLDING, AND LOWERING DEVICE.
APPLICATION FILED MAR. 1, 1902.
NO MODEL. 5 SHEETS—SHEET 5.
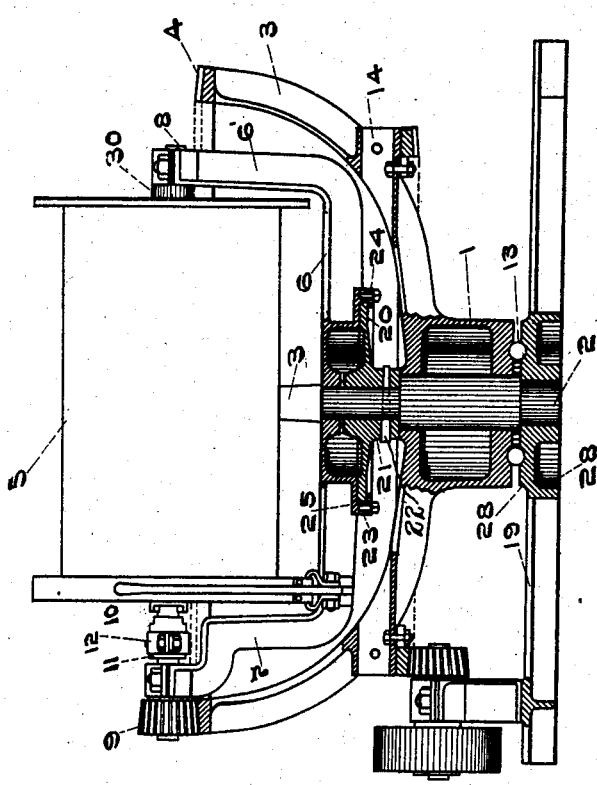

No. 739,261.

Patented September 15, 1903.

UNITED STATES PATENT OFFICE.

HENRY F. JAMES, OF FRANKLIN, PENNSYLVANIA.

HOISTING, HOLDING, AND LOWERING DEVICE.

SPECIFICATION forming part of Letters Patent No. 739,261, dated September 15, 1903.

Application filed March 1, 1902. Serial No. 96,247. (No model.)

*To all whom it may concern:*

Be it known that I, HENRY F. JAMES, of Franklin, in the county of Venango and State of Pennsylvania, have invented new and useful Improvements in Hoisting, Holding, and Lowering Devices; and I do hereby declare the following to be a full, clear, and exact description of said invention, reference being had to the accompanying drawings, and to the figures of reference marked thereon, which form a part of this specification.

My invention relates to improvements in hoisting, holding, and lowering devices, the construction and operation of which is here15 in fully shown and described, reference being had to the accompanying drawings, which form a part of this specification.

My object primarily is to provide an efficient, durable, convenient, and economical appliance for use around oil-wells for pulling rods and tubing and sand-pumping or bailing oil-wells, though my device is well adapted to a great variety of other uses, which will be hereinafter enumerated.

A device best adapted to the use specified should be portable, require little space for its operation, be rapid in its work, convenient to operate, be adapted to the slow or rapid letting out or unwinding of the rope or line from its drum, also be provided with means whereby the attached load may be held in any desired position independent of the operating power. All of which advantages and functions named I have embodied in my device by a new, novel, and mechanical arrangement and combination of parts.

Figure 1:
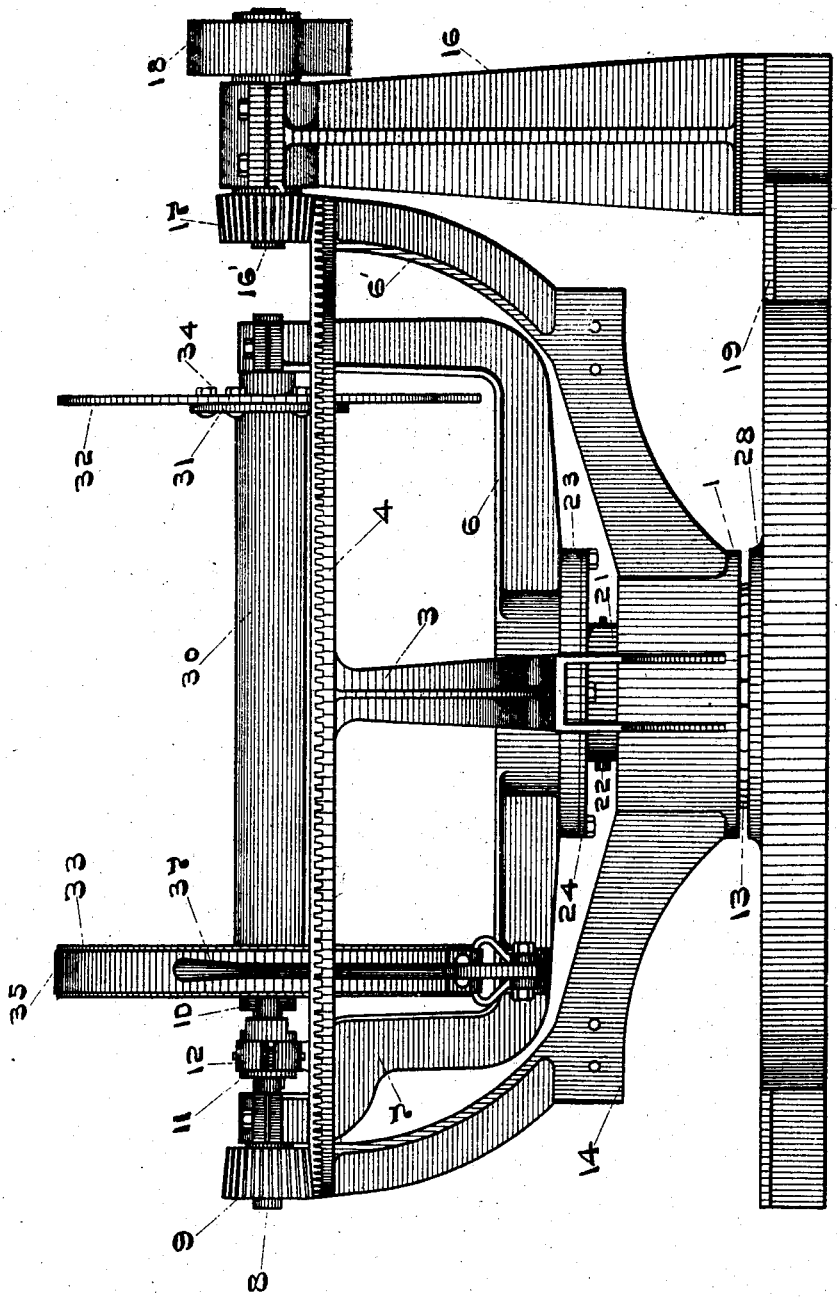
Figure 2:
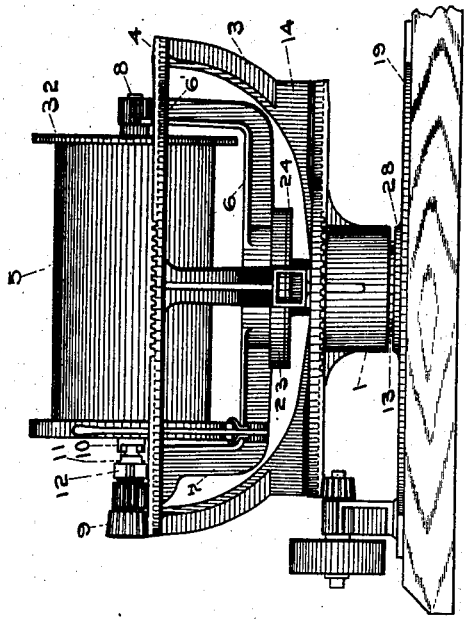
Figure 3:
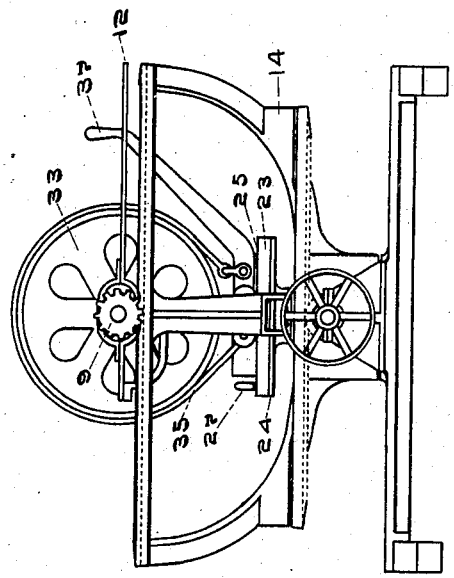

In the drawings, Figure 1 is a side elevation of the preferred form of my device. Fig. 2 is a side elevation of a somewhat-modified form thereof. Fig. 3 is an end elevation of Fig. 2. Fig. 4 is a plan view of the form shown in Fig. 2, a portion of the drum being broken away to expose other parts to view. Fig. 5 is an end view of the drum, a portion of the housing, the brake-band and brake-lever also being shown. Fig. 6 is a central vertical longitudinal section of one end of the drum. Fig. 7 is a perspective view of a semicylindrical shell used in lagging or altering the diameter of the drum. Fig. 8 is a plan view of the under side of the driving-gear used in my modified form of construction. Fig. 9 is a view showing the master-gear and a portion of the drum-housing in section, said section being taken at or about line A B of Fig. 4.

The same figures of reference indicate identical parts throughout the several views.

The elements of my device are a master-gear with means of revolving same by power, a stub-shaft upon which said master-gear is mounted, housing for a drum also mounted upon the same stub-shaft, a drum mounted in said housing, means of transmitting the motion of the master-gear to said drum, and the necessary mechanical details by which said elements are combined and operated, all of which are mounted upon a suitable base. The elements aforesaid and their related details I now proceed to describe specifically.

The master-gear is mounted to revolve horizontally and consists of a hub 1 centrally bored to receive a stub-shaft 2, which stub-shaft extends entirely through said hub 1 vertically. Projecting concavely upward from the upper portion of said hub 1 are several arms 3, which bear the working or toothed rim 4 of the master-gear, which is a bevel-gear with the teeth uppermost. As will be readily seen from the drawings, the conformation of the arms 3 is such that a considerable concavity is formed within the rim 4 between its upper or toothed face and the upper face of the hub 1, and in said concavity is located the drum 5 and its housing. Said housing is a horizontal bolster 6, at each end of which is an upwardly-projecting arm or support 6' and 7. Each of said arms 6' and 7 has at its upper extremity a suitable box or bearing for a shaft 8. Upon shaft 8 outside of the bearing on arm 7 is rigidly affixed a pinon 9, the teeth of which mesh with the teeth on the upper face of rim 4 of the master-gear and by which means motion is transmitted to the shaft 8 from the master-gear. A clutch (preferably the ordinary form of toothed clutch) is used for communicating the motion of shaft 8 to drum 5, upon which shaft said drum is revolubly mounted. One member 10 of said clutch is rigidly attached to one end of the drum 5, and the other member 11 is slidingly mounted or feathered upon shaft 8 in proper juxtaposition to member 10. Member 11 being feathered upon shaft 8 cannot revolve thereon, but is free to slide longitudinally thereon, thus being adapted to be moved in and out of engagement with member 10 by means of a lever 12.

The master-gear revolves horizontally upon stub-shaft 2 and rests, preferably, upon the balls 13, which support the weight of said gear and form a suitable bearing therefor. I do not, however, wish to limit myself to this form of bearing, as the balls shown could be dispensed with and other forms of bearings, such as rollers or hardened washers, could be substituted therefor.

My device is adapted to be operated by horse-power or by steam or other like power. When horse-power is to be employed, one or more sweeps 15 may be inserted in the sweep-sockets 14, to which a horse or horses may be hitched as the operating power. In case it is desired to operate my device by means of a belt from other than horse-power a pillow-block 16 is attached to the base of my device and extends upward in close proximity to and somewhat above rim 4 of the master-gear. Said pillow-block has at its upper portion a suitable bearing for a shaft or arbor 16', to which is rigidly keyed a pinion 17, the teeth of which engage with the teeth of the master-gear. Upon shaft 16' outside of the pillow-block (or on the side opposite to pinion 17) is keyed a pulley for the reception of a belt. When thus equipped, my device is adapted to be operated by belt from steam or other like power.

Stub-shaft 2 is also the supporting medium for the housing of drum 5, which is mounted as follows: A plate or disk 20, provided with a central hub or boss 21, is suitably bored through said hub to receive stub-shaft 2, which disk is placed upon said stub-shaft directly above the hub 1. Disk 20 is secured rigidly to stub-shaft 2, preferably by means of a taper pin 22, which passes through hub 21 and stub-shaft 2, securing the same rigidly together. The lower part or bolster 6 of the housing is provided with a flanged socket 23, the inner diameter of which socket is such as to receive disk 20 loosely, and the depth of said socket is equal to the thickness of said disk at its periphery, thus making the lower edge of disk 20 and the lower edge of socket 23 flush. To the lower edge of said socket is attached a flat ring 24, whose outer diameter coincides with the outer diameter of socket 23 and whose inner diameter is less than the outer diameter of disk 20, and by this means the housing is secured to disk 20, and thereby the housing is also secured to stub-shaft 2 and is free to revolve horizontally. As a further means of strengthening the housing aforesaid stub-shaft 2 is projected upwardly through the bolster 6, and the upper end of said stub-shaft is flush with the upper face of bolster 6. The exterior upper face of socket 23 is a horizontally-projecting flange 25, through which and through plate 20 in socket 23 is bored a number of holes 26. Said holes are in the same diameter radially, though not necessarily in the same angular location, and the housing is secured in any position of its horizontal rotation by inserting a pin or eyebolt 27 in holes 26 at any point where a hole in flange 25 may register with a hole in disk 20. It is thus obvious that drum 5 may stand in any position which best adapts it to the direction in which the rope or line to be wound thereon is to travel. The horizontal rotation of the drum aforesaid is for the purpose of adapting it to operate upon several wells which may be reasonably near to its location simply by turning the housing upon the stub-shaft so that the drum will face toward the well to be operated upon and the line extend therefrom in the desired direction at as nearly a right angle to the axis of the drum as may be practicable.

The base 19 consists of a central pad or boss 28, suitably bored centrally for the reception of a stub-shaft and in which said stub-shaft is inserted at a press fit. Said pad 28 is about equal in diameter to hub 1, and in case balls are to be used as a bearing for said hub a suitable ball-race may be formed in the upper face of said boss 28. Means are also provided for attaching said base to skids.

A detailed construction of the drum 5 is shown in Figs. 5 and 6, and from an inspection of said figures it will be readily understood that the diameter of said drum may be increased or diminished, and the construction which permits such alteration of size is substantially as follows: Said drum consists of a core or body 30, having flanges 31 at or near each end thereof, to which flanges are bolted heads 32 and 33, respectively, each of which heads are provided with a number of bolt-holes in several outwardly-ranging concentric circles for the purpose of bolting on semicylindrical shells 29, Fig. 7, which shells have at each end an annular flange extending outward at right angles to the body thereof. In said flanges are drilled bolt-holes to register with certain holes in the heads 32 and 33, and thus by selecting shells of the desired diameter and bolting them in place a drum of any reasonably desired diameter may be secured. This permissible variation in the diameter of drum is an important feature of my invention, the purpose of which is obvious—viz., that a weight which might be beyond the capacity of my device or the available power for operating same with a large drum would be easily managed with a drum of smaller diameter. The matter of speed of operation may be also governed by this feature of construction. Other advantages are also obtained which are sufficiently obvious as to need no mention. In the drawings one head, 33, is shown with a broadened periphery for the reception of a brake-band 35, one end of which is attached to lugs 36 on the housing directly beneath said head of the drum, and from thence said band 35 passes around head 33 and attaches to a brake-lever 37, which has its fulcrum in lugs 38 in the housing directly opposite lugs 36. In this method of construction it is obvious that the brake-band impinges upon the periphery of head 33 throughout the greater part of its circumference, and from the nearness of the point of attachment of the end of said band to the fulcrum of the lever it is obvious that great traction or resisting force may be applied to the drum either to stop same when in motion or to hold it with its attached weight in any desired position. For further increasing the efficiency of said brake the width of the periphery of head 33 and the width of band 35 may be increased to develop any necessary amount of traction or resistance between the brake-band and the head of the drum. Said drum is further shown and described in an application for Letters Patent of the United States for improvements in winding or hoisting drums, filed by me on the 28th day of November, 1902, Serial No. 133,142, and said drum is herein claimed in combination only with the other mechanism herein shown and described.

The operation of my device—in the pulling of rods from an oil-well, for instance—is substantially as follows: The master-gear is caused to revolve, either by horse or steam or other like power, as aforesaid, and motion is thereby communicated to the drum-pinion 9 and its attached shaft, together with member 11 of the clutch. One end of a rope is attached to the drum to be wound thereon and the other end of said rope is passed through a block at or near the top of the derrick, then brought down and attached to the rod of an oil-well by means of a special device called an "elevator." Member 11 of the clutch is now thrown into engagement with member 10 on the drum and the drum thereby caused to revolve, winding up the rope and raising or pulling the thereto attached rod from the well. When one joint of said rod is out and free of the tubing, the brake is applied to the drum, the clutch is disengaged, and by means of said brake the drum and its attached load are held stationary. Another elevator is now applied to the next succeeding joint of rod, and by slightly releasing the impingement of the brake said last-mentioned elevator is permitted to descend easily and rest upon the tubing, thereby sustaining the rod. The first joint is unscrewed, the rope detached therefrom and attached to the elevator of the second joint, and the operation above set forth is repeated until the rod or so much thereof as is desired is out of the well.

Besides the pulling of rods and tubing and the bailing and sand-pumping of oil-wells and various other uses in the oil industry my device is equally well adapted to many other uses, some of which are hoisting goods and merchandise in warehouses, upon docks and decks of ships, in the construction of buildings, in the storing of hay and other agricultural produce in barns, &c.

It is deemed that my device has now been sufficiently described to enable any one skilled in the art or industry to which it may be applied to make and use the same.

What I claim as new, and desire to secure by Letters Patent, is—

1. In a hoisting, holding and lowering device, a bevel-gear mounted on a vertical stub-shaft, adapted to revolve horizontally; a drum-housing also mounted on said stub-shaft; a drum mounted in said housing adapted to be revolved by said bevel-gear, all constructed, combined and operating substantially as specified.

2. In a hoisting, holding and lowering device, a base having a vertical stub-shaft rigidly mounted therein, a bevel-gear mounted on said stub-shaft adapted to be revolved horizontally by horse or steam power, a drum-housing mounted upon said stub-shaft, bearings in said housing for the reception of a shaft, a shaft revolubly mounted in said bearings, a drum revolubly mounted upon said shaft, a clutch, one member of which is affixed to the drum, the other member feathered to said shaft in juxtaposition to said other member, and adapted to be moved into engagement with and disengaged from said other member, a pinion rigidly affixed to said shaft the teeth whereof are adapted to engage with the teeth of said gear, all combined, arranged and operating substantially as described and for the purpose set forth.

3. In a hoisting, holding and lowering device, a bevel-gear, mounted as shown, a drum revolubly mounted within the rim or face of said bevel-gear, and adapted to be revolved thereby, said drum and its housing being adapted to revolve horizontally and to be secured at various intervals in its said horizontal revolution, substantially as and for the purpose specified.

4. In a hoisting, holding and lowering device, a bevel-gear mounted on a vertical stub-shaft, adapted to revolve horizontally, a drum-housing mounted on said stub-shaft, a drum mounted in said housing adapted to be revolved vertically by said gear, means of disconnecting said drum from the operation of said gear, means of arresting the motion of said drum when so disengaged and of stopping, governing and controlling the unwinding or retrograde motion of said drum, substantially as shown and described.

5. In a hoisting, holding and lowering device, the combination of a base carrying a vertical stub-shaft, a bevel-gear mounted on said stub-shaft adapted to be revolved horizontally by horse or steam power, a drum-housing mounted upon said stub-shaft adapted to revolve horizontally and to be secured at various angles, a shaft horizontally mounted in said drum-housing and revoluble therein, a pinion rigidly affixed to said shaft, with its teeth engaging with the teeth upon the bevel-gear, a drum revolubly mounted upon said shaft, means of transmitting motion to said drum from said shaft, means of disconnecting or disengaging said drum from the action of said shaft, means of arresting the motion of said drum and of governing its retrograde motion; all constructed, combined and operating substantially as shown and described.

In testimony whereof I affix my signature in presence of two witnesses.

HENRY F. JAMES.

Witnesses:
E. R. INMAN,
JOSEPH MANNIN.